United States Patent [19]

Ossandon

[11] Patent Number: 4,912,757
[45] Date of Patent: Mar. 27, 1990

[54] PAGING SYSTEM
[75] Inventor: Steven Ossandon, Babylon, N.Y.
[73] Assignee: Cellucom, Inc., West Babylon, N.Y.
[21] Appl. No.: 299,042
[22] Filed: Jan. 19, 1989
[51] Int. Cl.[4] ............................................. H04M 1/60
[52] U.S. Cl. ...................................... 379/217; 379/48; 379/395
[58] Field of Search ................. 379/48, 217, 170, 157, 379/395

[56] References Cited

U.S. PATENT DOCUMENTS

| | | | |
|---|---|---|---|
| 3,553,386 | 1/1971 | Golembeski | 379/48 X |
| 4,013,844 | 3/1977 | Saxon | 379/157 |
| 4,440,989 | 4/1984 | Gibb | 379/157 |
| 4,656,652 | 4/1987 | Nagai | 379/41 |

*Primary Examiner*—Thomas W. Brown
*Attorney, Agent, or Firm*—Bauer & Schaffer

[57] ABSTRACT

A paging system for a PBX comprises an amplifier/speaker module adapted to remain coupled across the Ring and Tip lines of a given phase of the PBX. The module responds to audio signals sent through such lines when the conventional polarity of same are reversed and a DC operating bias is applied thereto. The audio signals are superimposed on the DC bias. A relay controls the polarity of the Ring and Tip lines and when activated, reverses the polarity of such lines whereupon the module amplifies the audio signals and applies them to a speaker. The module includes circuitry to prevent the amplifier from operating when the relay is de-energized and Ring and Tip lines are of conventional polarity.

16 Claims, 2 Drawing Sheets

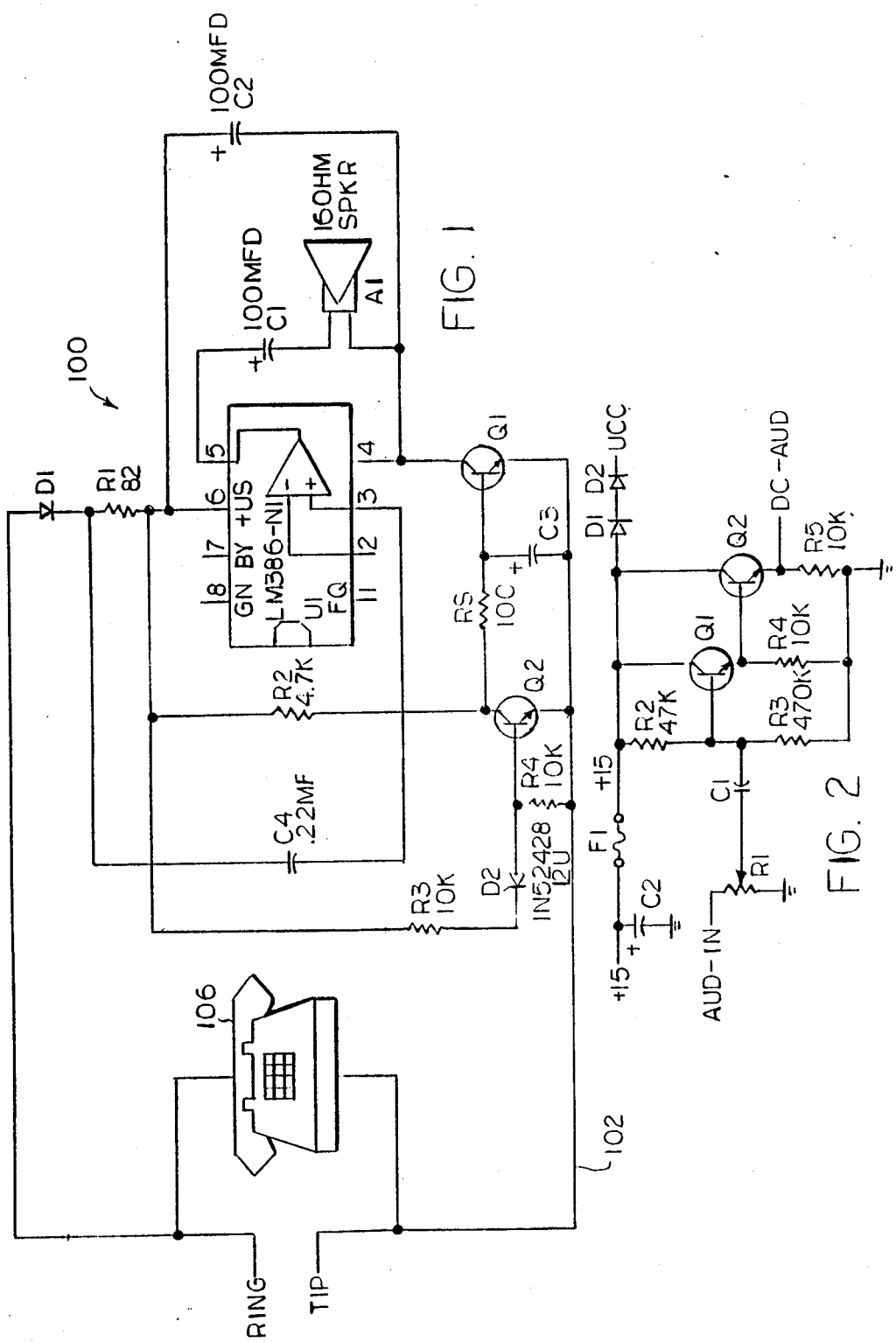

PAGING SYSTEM

FIELD OF THE INVENTION

This invention relates to an emergency paging system for a building and more particularly to a paging system that uses the existing phone lines of a private branch exchange (PBX) as the link between a given room in the building and the central PBX.

BACKGROUND OF THE INVENTION

In large buildings such as hotels and offices, it is often desirable to have the ability to alert the occupants of the building as to the existence of an emergency, and to provide each occupant with information such as evacuation instructions. One method of doing the same would be by a loudspeaker in each room to communicate an audible message to the occupant. Convenience and safety would dictate that the emergency message be transmitted to each room simultaneously.

There are many systems available for the transmission of emergency communications to the rooms of a building. Many such systems use the existing telephone lines as the link between a central paging system and the remote room. These systems are rather complicated and often times totally disable the phone system. Generally they employ rather involved hardware to generate the audio message and the necessary voltages to activate the particular system. And, it is not uncommon for such systems to require involved retrofitting to existing lines with the attendant cost for same. Of course there are other approaches that do not use the existing phone lines to convey the emergency traffic but they might require the added cost of a wireless link or additional hardwiring in the building.

SUMMARY OF THE INVENTION

The present invention overcomes several of the above-noted drawbacks and provides a means of communicating an emergency message between a central (PBX) and each room of a building, via a loudspeaker mounted in each room. The loudspeaker receives its audio (emergency message or traffic) by means of a momentary, switched, hardwired connection to the room telephone line. The loud speaker can be conveniently mounted in a small box, hereinafter called Room Module, which, itself, can be mounted almost anywhere. The Room Module includes an audio amplifier and a speaker. More particularly, each room module is connected in parallel across the existing "Ring" and "Tip" lines going to a given room and used by the phone therein to connect the phone to the remote PBX. A switch module or switch station and associated control logic (one switch module and associated logic for each remote room or phone) is placed in or near the existing PBX.

When the inventive system is in use, the switch module disconnects each telephone line (Ring and Tip) from the telephone PBX and applies a +12 VDC voltage across each such disconnected Ring and Tip line, which is opposite in polarity from the polarity normally existing on the Ring and Tip line. The audio of the emergency message is superimposed or modulated onto this 12 VDC and appears as a small ripple voltage of about 0.5 volts on the same. When the inventive switch module disconnects a given pair of telephone lines (Ring and Tip) from the standard PBX Ring and Tip terminals, and connects the respective Ring and Tip lines across the 12 VDC noted above, the circuitry in the room module responds to the reversed polarity of the 12 bias existing on such lines whereupon the audio traffic impressed on the 12 volt bias is amplified and applied to the speaker.

Special circuitry in the Room Module insures that the same does not interfere with normal telephone (PBX) operation. This circuitry also prevents the Room Module from operating (or loading down the Ring and Tip lines) unless the polarity of the voltage appearing across the Ring and Tip lines is opposite from the conventional polarity for such lines. After the message is delivered to the room, any individual phone can be picked up and reconnected to the PBX system. With the inventive apparatus emergency paging to one room and normal use of the phone in another can occur simultaneously.

It should be kept in mind that the requirement that the Room Module share or be placed across the existing Ring and Tip lines creates some demanding design requirements on the inventive apparatus. When the inventive system is inactive, the Room Module must not respond to normal telephone conversations, and it must be protected from (and not respond to) the relatively high voltage used as the telephone ringing voltage. This ringing voltage can approach the 100 volt RMS AC level. And, the single pair of phone wires (Ring and Tip) must provide both power for the Room (audio amplifier/speaker) module and simultaneously carry the audio signal (emergency message).

OBJECTS OF THE INVENTION

It is therefore an object of the present invention to provide an emergency paging system that works in conjunction with an existing PBX.

It is a further object of the present invention to provide an emergency paging system for a PBX that utilizes the lines going to a given phone for the conduction of emergency communications to a remotely mounted amplifier module and speaker placed across such lines.

It is another object of the present invention to provide an emergency paging system that employs a stand-alone amplifier module and speaker for a given phone and wherein such module will not interfere with normal PBX operation.

It is a further object of the present invention to provide a means for emergency communication on a PBX system that is capable of using a single pair of existing phone lines and that when in operation requires only a single reverse voltage of a defined magnitude for its activation.

It is another object of the present invention to provide apparatus for emergency communication on an existing PBX wherein the apparatus is capable of delivering the emergency message simultaneously along a multitude of associated phone lines and after doing so allows a given phone to be reconnected to the PBX merely by lifting the same off-hook.

Other objects and features of the present invention will become apparent from the following detailed description considered in connection with the accompanying drawings. It is to be understood, however, that the drawings are designed for purposes of illustration only and not as a definition of the limits of the invention for which reference should be made to the appending claims.

BRIEF DESCRIPTION OF THE DRAWINGS

In the drawings, wherein the same reference numeral denotes the same element throughout the several views:

FIG. 1 is a schematic diagram of the inventive stand-alone audio amplifier/speaker or Room Module shown coupled to a given phone;

FIG. 2 is a schematic diagram of the driver circuity for supplying the operating DC voltage (bias) and superimposing the audio (emergency message or paging signal) thereon;

DESCRIPTION OF THE INVENTION

Figure 3:
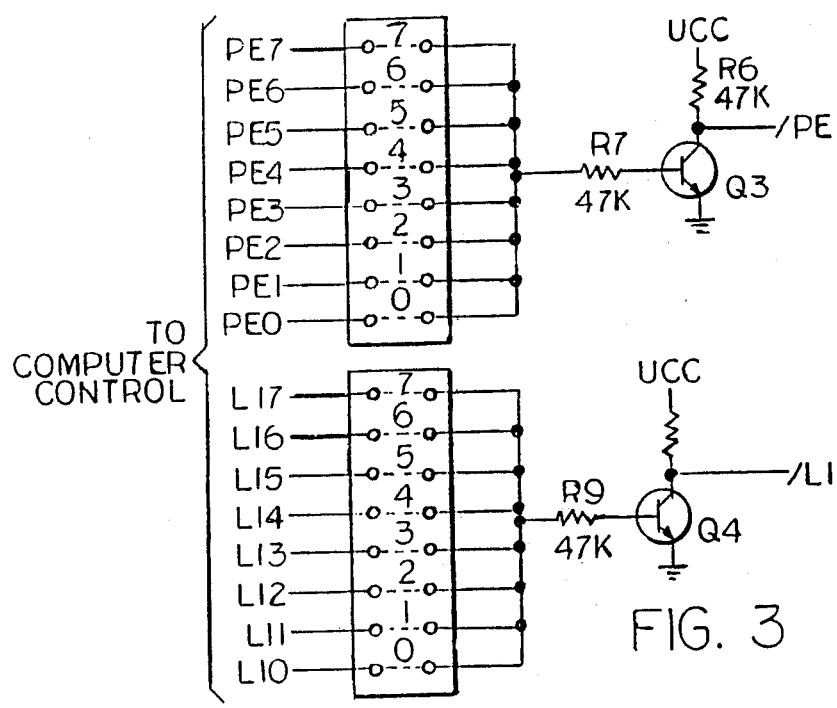
FIG. 3 is a schematic diagram of the zone control circuitry for the simultaneous paging of a group of phones; and, FIG. 4 is a schematic diagram of the switch station and logic control circuitry for switching the operating bias and emergency message to the Ring and Tip line of a given phone.

Referring now to FIG. 1 there is shown the inventive remotely mounted amplifier/speaker or Room Module seen generally as reference numeral 100. As will be described below and during operation of the inventive system, Tip line 102 will be switched to ground and Ring line 104 will be switched to a source of about +12 volts DC, with the message audio superimposed thereon. In this operative condition a diode D1 is forward biased and passes both the 12 DC and superimposed AC message signal. The combination of a resistor R1 and a capacitor C2 serve to provide some decoupling for an IC audio amplifier U1. Amplifier U1 is an conventional IC audio amplifier and in this implementation is an LM-386 manufactured by the National Semiconductor Corporation. Of course there are many other audio amplifier configurations that will work equally well. Q1, a high-voltage NPN transistor, is switched on via base resistor R2. Accordingly, the amplifier operates with just under 12 volts across it. As will be described below, the +12 volt DC bias placed across the Ring and Tip lines is actually closer to between 12.4 and 13 volts. D2 is a 12 volt zener diode. Because of this diode, the just under 12 volts at the amplifier's +Vs supply is not sufficient to turn on an NPN transistor Q2. The audio riding on the +12 volt supply (Ring) line (the Tip line is now at ground potential, as will be explained below) is coupled from the cathode of diode D1 into the non-inverting input of amplifier U1. In this amplifier the inputs are internally biased, and although the inverting input appears to be floating, it is internally referenced to −Vs. One side of a speaker A1 is coupled to pin 4 or −Vs of amplifier U1. The other side of the speaker is AC coupled to the output, pin 5, of U1 by means of a capacitor C1. The phone will work with either DC polarity. Accordingly, when the Room Module is operating, as will be described below, the audio riding on the 12 VDC can be heard in the phone earpiece, if the phone is lifted off-hook. The volume or amount of audio superimposed on the 12 volt bias for proper operation of speaker A1 is about the right level for proper operation of the phone earpiece.

In a normal phone system the Ring connection or line is a negative voltage, typically 48 volts. The Tip line is referenced to ground. Accordingly, the Room Module is designed to run from a positive DC voltage. Diode D1 serves to block the normal negative phone bias, and pass the positive inventive audio amplifier bias. But when the phone rings the AC ringing signal can approach the 100 volts RMS, noted above. A ringing voltage of this magnitude means that D1 will pass the positive halves of the ringing voltage. This could seriously load the Ring generator, and the Ring frequency could cause an annoying motorboating in speaker A1. Some further circuitry is required to isolate the amplifier/speaker or Room Module from the ringing voltage.

Transistor, Q1, is used to break the circuit at the Tip connection. When the inventive system is in actual operation about +13 volts will be switched (in a manner described below) onto and appear across the Ring and Tip line, with the former more positive than the latter. About 0.7 volts of this is dropped across D1. A few tenths of a volt are dropped across resistor R1, leaving about 12 volts, or a little less to be applied to amplifier U1. Resistors R2 and R5 serve to keep Q1 turned on which completes the Ring-to-Tip circuit. The voltage at the top of resistor R3 is not sufficient to overcome the 12 volt zener voltage of diode D2 and thus transistor Q2 remains off.

When the ringing voltage goes positive, the voltage at the top of resistor R3 eventually rises above the 12.6 volt threshold determined by D2 and Q2. At this point Q2 turns on and shorts the drive to Q1. With its drive effectively short-circuited, Q1 now turns off, open-circuiting the connection between the Tip line and the amplifier-speaker combination or, more precisely, the Tip line and junction of pin 4 (−Vs of U1) and the above-noted side of speaker A1. Q1 would tend to turn on, again, momentarily at the beginning of the next positive excursion of the ringing signal However, the need to charge capacitor C3 prevents Q1 from turning on, even momentarily, before Q2 turns on.

Since it was noted above that the audio signal is riding on the amplifier bias voltage (placed across the Ring and Tip line), a capacitor C4 couples the AC signal into the amplifier input for amplification by same to drive speaker A1. Capacitor C2 bypasses the AC signal around the amplifier and prevents the same from appearing at the +Vs line or pin 6 of U1. With this arrangement a single pair of wires (the Ring and Tip) can carry both the amplifier DC bias (12 volts) and the AC (emergency audio) signal.

Referring now to FIG. 2 there is shown the circuitry for supplying the DC operating bias with superimposed audio for a zone or cluster of up to 25 phones. The driver consists of two NPN transistors Q1 and Q2 connected as two directly coupled emitter-follower stages Given a 15 volt supply, the input divider consisting of a resistor R2 and a resistor R3, establishes a DC voltage of about 13.6 volts. Subtracting from this the two base-emitter diode drops of Q1 and Q2, the voltage at the emitter of Q2 is about 12.4 volts (assume it to be 12 volts). The audio (emergency message) is AC coupled into the input divider by means of a capacitor C1. The audio, taken off of the wiper arm of a pot R1, sees a relatively high impedance of about 40K ohms and appears superimposed on the 12 volt DC output (emitter) of Q2. A single Room Module (audio amplifier), described above with reference to FIG. 1, takes about 20 mA to run. For 25 channels (25 separate phones or rooms) the current would be about 500 mA. If a phone is taken off-hook, the current increases by about 40 mA. If ten phones out of 25 were taken off-hook, the extra current would be about 400 mA. The total current is therefore about 400 mA plus 500 mA or about 1 amp.

Q2 is a 3 amp power transistor (for example, a 2N3055) mounted on a heat sink.

Figure 4:
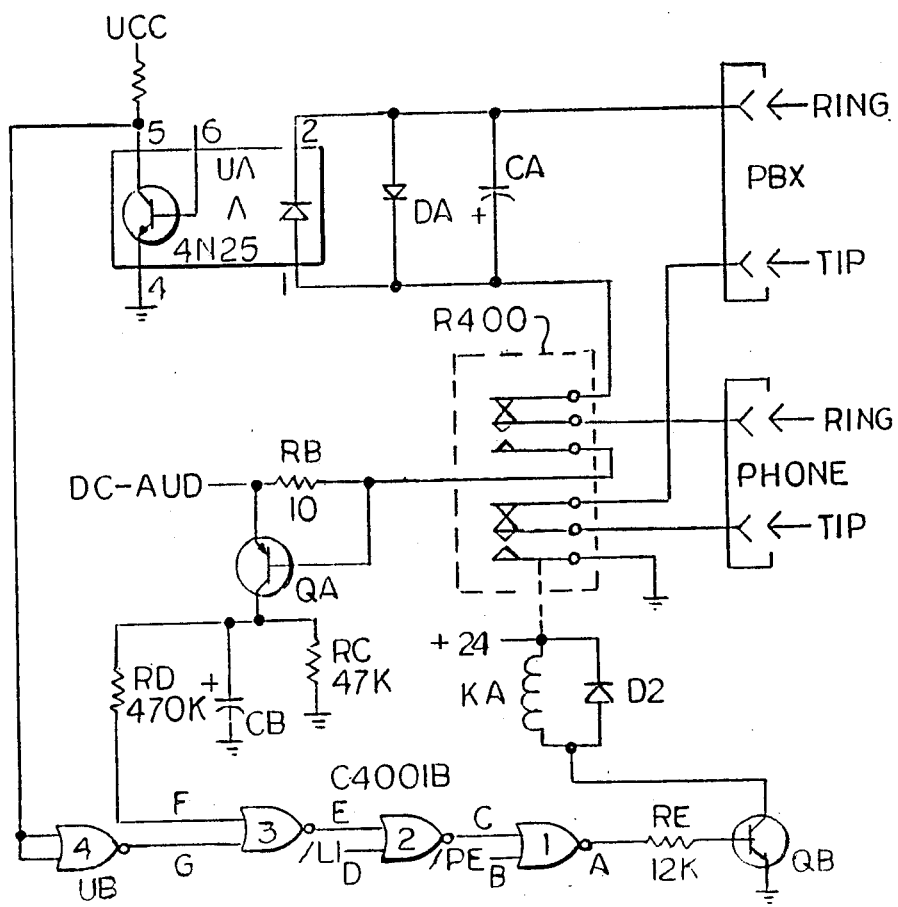

Referring now to FIG. 3 and 4 there is respectively shown the priority or zone control and relay (switch) control circuitry of the inventive system. An NPN transistor, Qb, is used to turn on a relay R400 going to a given phone in a cluster or zone. Hence for a cluster or zone of 25 phones this circuitry will be duplicated 25 times, preferably on a single board. If there are, say, eight such zones, there will be eight associated boards each with the given number of phones for that zone, which, in this case is 25. Implementation for relay driver transistor Qb is an AND function comprised of a quad of CMOS NOR gates 1, 2, 3, and 4 with respective capital lettered inputs and outputs A, B, C, D, E, F, and G seen in FIG. 4. Relay R400 will be turned or switched on when output A of NOR gate 1 is high. This occurs when its inputs B and C are low. All 25 channels or phones on the board are assigned the same paging zone. There can be up to eight of the zones noted above and hence eight corresponding Page Enable (PE) and eight Loop Inhibit (LI) signals from computer interface lines PE0–PE7 and LI0–LI7 seen in FIG. 3. The signals appearing on these lines are standard TTL level signals. One of these Page Enable signals is jumpered to define which zone a particular channel board belongs. In the implementation shown in FIG. 3, a corresponding one of the eight Loop Inhibit (LI0–LI7) signals must be jumpered also. NPN transistors Q3 and Q4 shown in FIG. 3 buffer the respective PE and LI signals and provide both logic inversion and level shifting from the five volt TTL computer logic to the 13 volt CMOS logic level used by the C4001 CMOS NOR gate chip.

Use and operation of the embodiment of FIGS. 1-4 is as follows. When it is desired to page a cluster or group of phones, all of the LI signals are false and hence by operation of inverter Q4 of FIG. 3, the /LI signal will be high at the D input to NOR gate 2 of FIG. 4. Input C of Nor gate 1 will be low. If a low-true /PE signal is applied to input B of NOR gate 1, the NOR output A will go high and relay R400 will energize. Accordingly, all relays in a zone are energized when paging in that zone is initialed. Energizing relays R400 of a given zone switches the respective Ring and Tip lines going to an associated phone 106, seen in FIG. 1. When each relay of a given zone is energized the Ring line associated therewith will be switched to the +12 VDC bias (with superimposed audio) from the emitter-follower driver of FIG. 2 (in series with 10 ohm resistor RB), and the Tip line will be switched to ground. Amplifier U1 of FIG. 1 will now amplify the signal superimposed on the 12 volt bias appearing on the Ring line and deliver the same to speaker A1, as described above.

Normally the message amplified by amplifier U1 will be voice synthesized by the computer generating the PE and LI signals (bits). After the computer generates the first complete page message, it sets the LI bit for that particular zone or cluster of relays R400 true, permitting any phone in that zone to be reconnected to the PBX on an individual basis and this can occur as follows. Referring to FIG. 4, resistor RB operates to sense the current drawn by the associated phone to which it is serially connected. Quiescent current through each resistor RB in a zone is about 10 mA. AC peaks are 25 mA or more effecting a 0.25 volt drop across resistor RB. When a given phone is lifted off-hook, about 50 mA will be drawn through its associated resistor RB and the voltage drop across the same will be sufficient to turn a transistor QA forcing input E (the output of NOR gate 3) low. With inputs D and E now both low, C goes high and A goes low, killing the drive to transistor QB. While AC current spikes during paging will cause transistor QA to turn on momentarily, the need to charge a capacitor CB prevents input F from reaching a high state.

When the drive to the relay is killed by picking up the given phone, the connection is made back to the PBX system. Off-hook current is now drawn through an opto-isolator, UA. The NPN transistor in the isolator turns on and the input to NOR gate 4 will be low. The output of the last-mentioned NOR gate, G, will be high. As an input to NOR gate 3, output G will continue to hold relay R400 off. That is, input F going high turns off relay R400 initially, and input G continues to hold it off after switching over to the PBX.

While only a single embodiment of the present invention has been shown and described, it is to be understood that many changes and modifications can be made hereto without departing from the spirit and scope hereof.

What is claimed is:

1. A paging system for a PBX comprising an amplifier module adapted to be coupled across the Ring and Tip lines of a given phone of the PBX and adapted to respond to audio signals sent through such lines when the conventional polarity of same are reversed, means for generating a DC bias for powering said amplifier module, said means including means for superimposing the audio signals onto the DC bias, and means for reversing the conventional polarity of the Ring and Tip lines and applying the DC bias with the superimposed signals to such polarity reversed Ring and Tip lines whereby said amplifier module responds to such superimposed signals by amplifying the same.

2. The paging system of claim 1, further comprising transducer means coupled to the output of said amplifier module for converting the same to an audible response.

3. The paging system of claim 2, said means for reversing the conventional polarity of the Ring an Tip lines comprising a relay whose contacts, in normal PBX operation, apply the conventional DC polarity of a positive voltage to the Tip line and a negative voltage to the Ring line and when the conventional polarity is reversed apply a relatively more negative voltage to the Tip line and the DC bias with the superimposed signals to the Ring line.

4. The paging system of claim 3, further comprising logic control means for activating said relay in response to command from a computer.

5. The paging system of claim 2, wherein said means for generating a DC bias comprises a solid state means whose output corresponds to its input and the superimposed signals are coupled into such input.

6. The paging system of claim 5, wherein said solid state means comprises a bipolar transistor configured as an emitter-follower.

7. The paging system of claim 5, wherein said solid state means comprises two bipolar transistors configured as a directly coupled emitter-follower pair.

8. A paging system for PBX comprising an amplifier/speaker module adapted to be coupled across the Ring and Tip lines of a given phone of the PBX and adapted to respond to audio signals sent through such lines when the conventional polarity of same are reversed, a directly coupled emitter-follower pair for generating a DC bias that is used to power said amplifier/speaker module, said emitter-follower pair adapted to superimpose the audio signals onto the DC bias, means for reversing the conventional polarity of the Ring and Tip lines and applying the DC bias with superimposed audio signals to such polarity reversed Ring and Tip lines, and logic control means for operating the former-mentioned means, said logic control means adapted to respond to computer control whereby when the last-mentioned means operates said means for reversing the conventional polarity of the Ring and Tip lines, an amplifier of said amplifier/speaker module responds to the superimposed audio signals by amplifying the same and driving a speaker of said amplifier/speaker module.

9. The paging system of claim 8, wherein said means for reversing the conventional polarity of the Ring and Tip lines includes a relay adapted to be energized by said logic control means.

10. The paging system of claim 9, wherein said logic control means includes means, responsive to the phone being lifted off-hook, for de-energizing said relay and thus restoring normal PBX operation after the superimposed audio signals are delivered to said amplifier/speaker module.

11. The paging system of claim 10, including means in said amplifier/speaker module electrically to isolate the same from the Ring and Tip lines when such lines are of conventional polarity.

12. A method of employing a PBX telephone network as a paging system comprising the steps of providing an amplifier module couplable across the Ring and Tip lines of a given phone of the PBX, generating a DC bias for powering the amplifier module, superimposing audio signals onto the DC bias, reversing the conventional polarity of the Ring and Tip lines and applying the DC bias with the superimposed signals to such polarity reversed Ring and Tip lines whereby the amplifier module responds to such superimposed signals by amplifying the same.

13. The method of claim 12, including the step of applying the output of said amplifier module to a speaker.

14. The method of claim 13, wherein said step of reversing the conventional polarity of the Ring and Tip lines is accomplished by providing a logic controlled relay, and applying a defined set of logic control commands to the logic controlled relay for energizing the same.

15. The method of claim 14, including the step of restoring normal PBX operation in response to the phone being lifted off-hook after the superimposed audio signals are delivered to the amplifier module.

16. The method of claim 15, including the step of electrically isolating the amplifier module from the Ring and Tip lines when such lines are of conventional polarity.

* * * * *